United States Patent
Bell et al.

(10) Patent No.: US 10,479,406 B2
(45) Date of Patent: Nov. 19, 2019

(54) MOTOR VEHICLE ASSEMBLY INCORPORATING A FRONT END MODULE, A FRONT SUSPENSION AND A SORB STRUCTURE

(71) Applicant: FORD GLOBAL TECHNOLOGIES, LLC, Dearborn, MI (US)

(72) Inventors: Scott J. Bell, Canton, MI (US); Jeffrey A. Walesch, Canton, MI (US); Jayanth Kumar Basavalingiah, West Bloomfield, MI (US); Richard F. Huddleston, III, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 145 days.

(21) Appl. No.: 15/626,747

(22) Filed: Jun. 19, 2017

(65) Prior Publication Data
US 2018/0362086 A1 Dec. 20, 2018

(51) Int. Cl.
| B62D 21/11 | (2006.01) |
| B62D 25/08 | (2006.01) |
| B62D 21/15 | (2006.01) |

(52) U.S. Cl.
CPC .......... B62D 21/11 (2013.01); B62D 21/152 (2013.01); B62D 21/155 (2013.01); B62D 25/084 (2013.01); B62D 25/085 (2013.01)

(58) Field of Classification Search
CPC ..... B62D 21/11; B62D 21/152; B62D 25/084
See application file for complete search history.

(56) References Cited

U.S. PATENT DOCUMENTS

| 6,386,624 | B1 | 5/2002 | Schultz et al. | |
| 6,540,284 | B2 | 4/2003 | Miyata | |
| 6,755,461 | B2 | 6/2004 | Seksaria et al. | |
| 7,213,873 | B2* | 5/2007 | Murata | B62D 21/11 296/187.09 |
| 7,866,716 | B2 | 1/2011 | Perucca et al. | |
| 7,900,964 | B2* | 3/2011 | Chretien | B62D 21/152 280/784 |
| 2005/0082782 | A1* | 4/2005 | Jolley | B60K 17/22 280/124.109 |
| 2008/0224502 | A1* | 9/2008 | Miki | B62D 25/082 296/203.02 |
| 2009/0085373 | A1* | 4/2009 | Terada | B62D 21/152 296/187.09 |

(Continued)

FOREIGN PATENT DOCUMENTS

| CN | 202923320 U | 5/2013 |
| DE | 102009058558 A1 | 7/2010 |

(Continued)

OTHER PUBLICATIONS

English Machine Translation of CN202923320U.
English Machine Translation of DE102009058558A1.
English Machine Translation of EP1321351A2.

*Primary Examiner* — Darlene P Condra
(74) *Attorney, Agent, or Firm* — Raymond L. Coppiellie; King & Schickli, PLLC

(57) ABSTRACT

A motor vehicle assembly includes a front end module, a front suspension and a SORB structure connected to the front end module and the front suspension. That SORB structure includes a cross member, a first crush horn, a second crush horn, a first support bracket and a second support bracket.

17 Claims, 8 Drawing Sheets

(56) References Cited

U.S. PATENT DOCUMENTS

| | | | | |
|---|---|---|---|---|
| 2012/0049571 A1* | 3/2012 | Katou | .................. | B62D 21/152 |
| | | | | 296/187.09 |
| 2012/0181803 A1* | 7/2012 | Snell | .................... | B62D 21/152 |
| | | | | 293/133 |
| 2012/0248820 A1* | 10/2012 | Yasui | ...................... | B60R 19/34 |
| | | | | 296/187.09 |
| 2013/0099461 A1* | 4/2013 | Otani | ....................... | B60G 7/02 |
| | | | | 280/124.109 |
| 2016/0083013 A1* | 3/2016 | Fujihara | ............... | B62D 21/152 |
| | | | | 296/187.09 |
| 2018/0273094 A1* | 9/2018 | Komiya | ................. | B62D 21/00 |

FOREIGN PATENT DOCUMENTS

| | | |
|---|---|---|
| EP | 1321351 A2 | 6/2003 |
| WO | 2011119764 A1 | 9/2011 |

\* cited by examiner

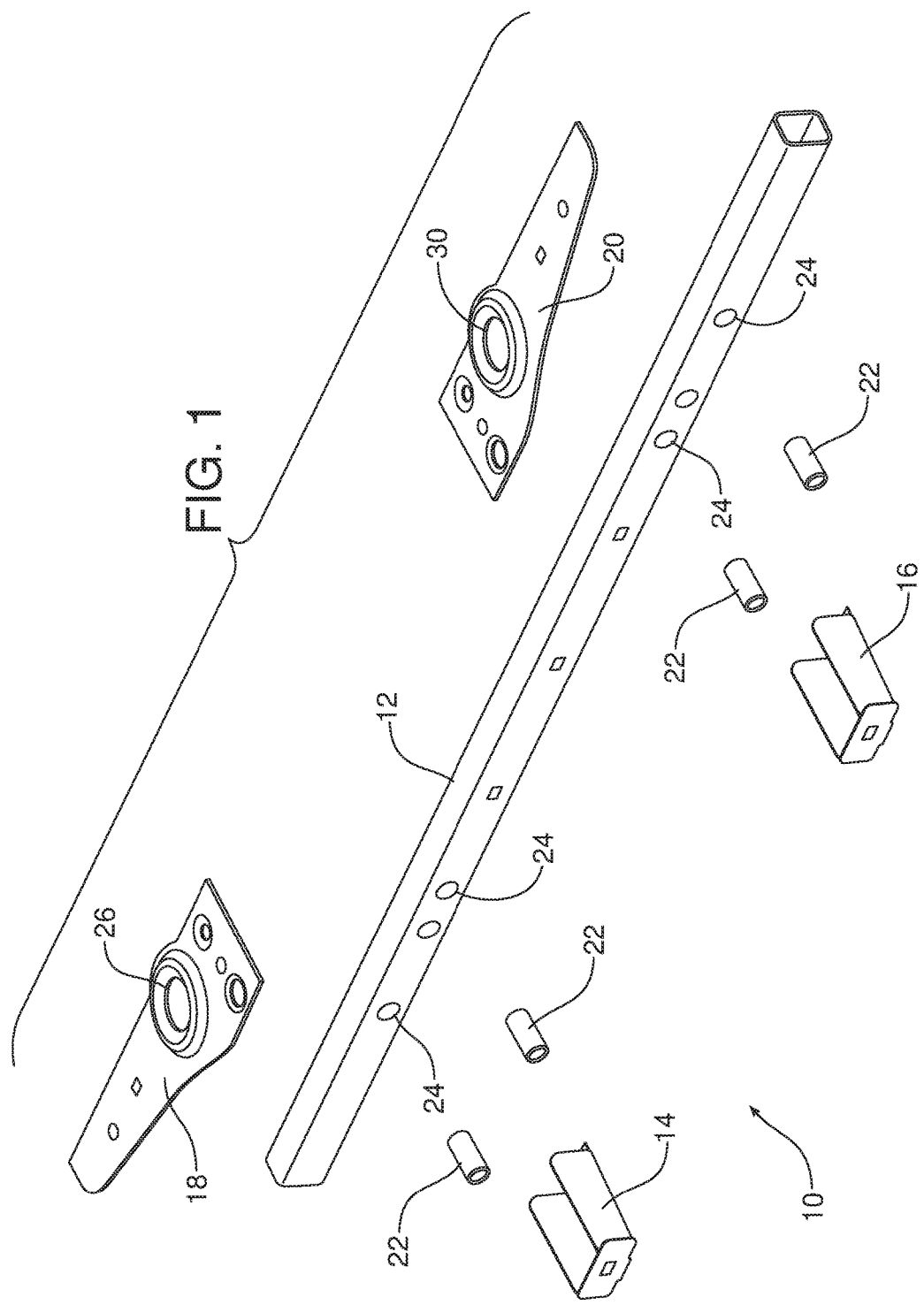

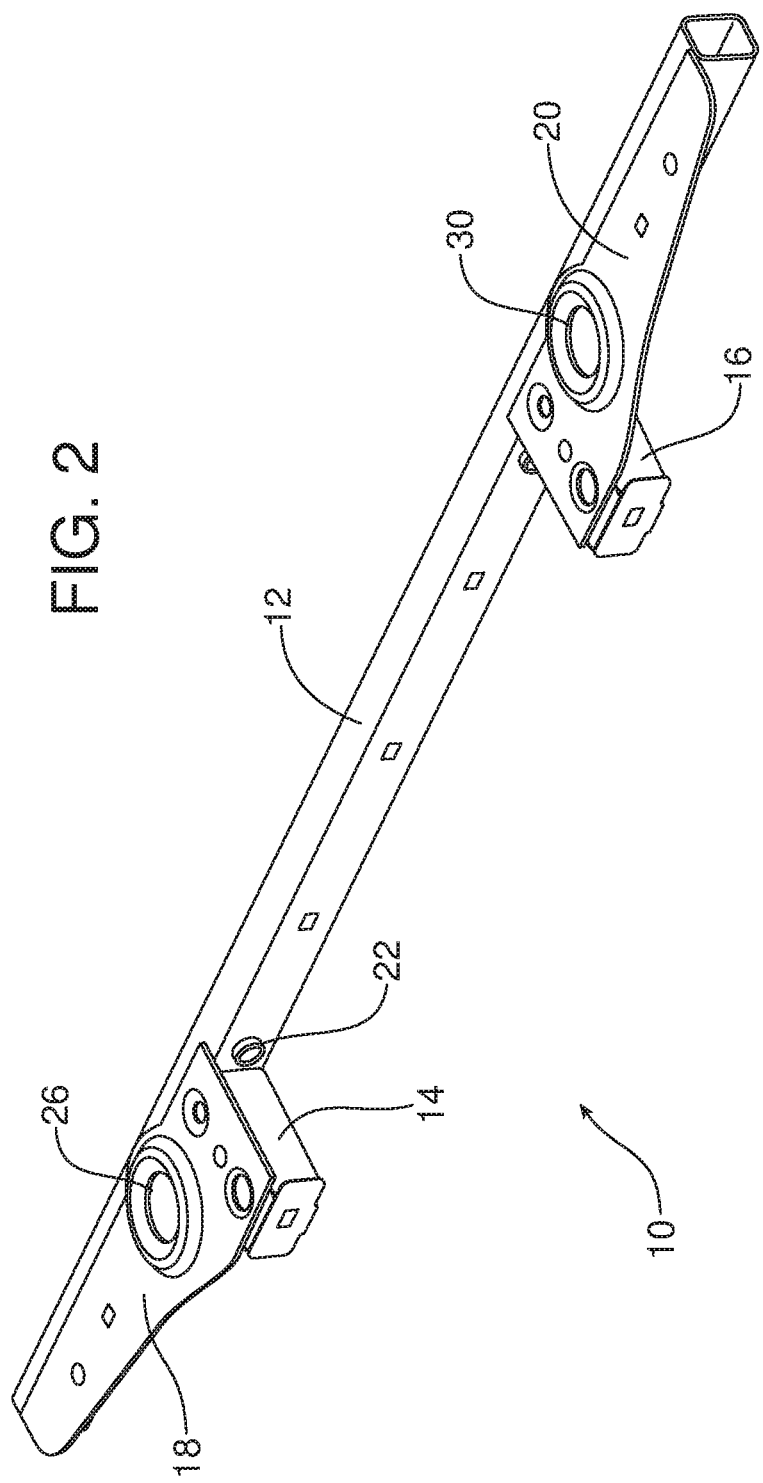

MOTOR VEHICLE ASSEMBLY INCORPORATING A FRONT END MODULE, A FRONT SUSPENSION AND A SORB STRUCTURE

TECHNICAL FIELD

This document relates generally to the motor vehicle equipment field and, more particularly, to a new and improved motor vehicle assembly incorporating a front end module, a tension-link suspension chassis and a small offset rigid barrier or SORB structure connected to the front end module and the tension-link suspension chassis.

BACKGROUND

It is known in the art to utilize a front end module assembly strategy in order to improve production line efficiency and build quality. This involves installing a completed front end module (FEM) onto the motor vehicle coming down the assembly line. Such an FEM may include a housing holding critical cooling components, such as a radiator, an air conditioning condenser, a transmission oil cooler and a turbo charger intercooler, for the motor vehicle. In some situations, the motor vehicle manufacturer may also wish to include a tension-link front suspension to provide the motor vehicle with improved handling. Unfortunately, a front end module and a tension-link front suspension compete for design space in the front corners of the motor vehicle significantly limiting space to accommodate a SORB structure that enhances energy absorption and crashworthiness in the event of a small offset impact event.

This document relates to a new and improved motor vehicle assembly which meets the seemingly conflicting requirements so as to accommodate a SORB structure in the relatively limited packaging space at the front corners of a motor vehicle equipped with an FEM and a tension-link front suspension.

SUMMARY

In accordance with the purposes and benefits described herein, a new and improved motor vehicle assembly is provided. That motor vehicle assembly comprises a front end module (FEM), a front suspension, such as a tension-link front suspension and a small offset rigid barrier (SORB) structure connecting the front end module and the front suspension.

More specifically, the front suspension may include a first tension link, a second tension link and a sub-frame. The SORB structure may include a cross car beam or cross member, a first crush horn carried on the cross member and a second crush horn carried on the cross member. In addition, the SORB structure may include a first radiator mount or support bracket extending between the first crush horn and the cross member outboard of the first crush horn. Further, the SORB structure may include a second radiator mount or support bracket extending between the second crush horn and the cross member outboard the second crush horn.

The motor vehicle assembly may further include a first receiver in the first bracket and a second receiver in the second bracket. Further, the motor vehicle assembly may include a bushing or first isolator in the first receiver and a second bushing or second isolator in the second receiver to support the front end module and, more particularly, the radiator of the front end module.

The motor vehicle assembly may further include a first fastener connecting the cross member to the sub-frame of the front suspension. That sub-frame may include a first side member having a first longitudinal axis and a second side member having a second longitudinal axis. When properly assembled, the first crush horn is aligned along the first longitudinal axis of the first side member and the second crush horn is aligned along the second longitudinal axis of the second side member. Further, the first crush horn, the second crush horn and the cross member of the SORB structure and the first side member and the second side member of the front suspension sub-frame are coplanar. In such an embodiment, the first support bracket and the cross member project outboard of the first side member while the second support bracket and the cross member project outboard the second side member.

The front end module may further include a radiator overlying the cross member. Further, the front end module may further include a bolster. When assembled, the cross member may be sandwiched between the bolster of the front end module and the forward ends of the first side member and the second side member of the front suspension sub-frame. A first fastener, such as a series of bolts, may connect the cross member to the sub-frame. A second fastener such a second series of bolts, may connect the bolster to the cross member.

In the following description, there are shown and described several preferred embodiments of the motor vehicle assembly. As it should be realized, the motor vehicle assembly is capable of other, different embodiments and its several details are capable of modification in various, obvious aspects all without departing from the motor vehicle assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the motor vehicle assembly and together with the description serve to explain certain principles thereof.

FIG. 1 is an exploded perspective view of the SORB structure utilized in the new and improved motor vehicle assembly.

FIG. 2 is a perspective view of the SORB structure illustrated in FIG. 1 in the fully assembled condition.

Figure 3A:
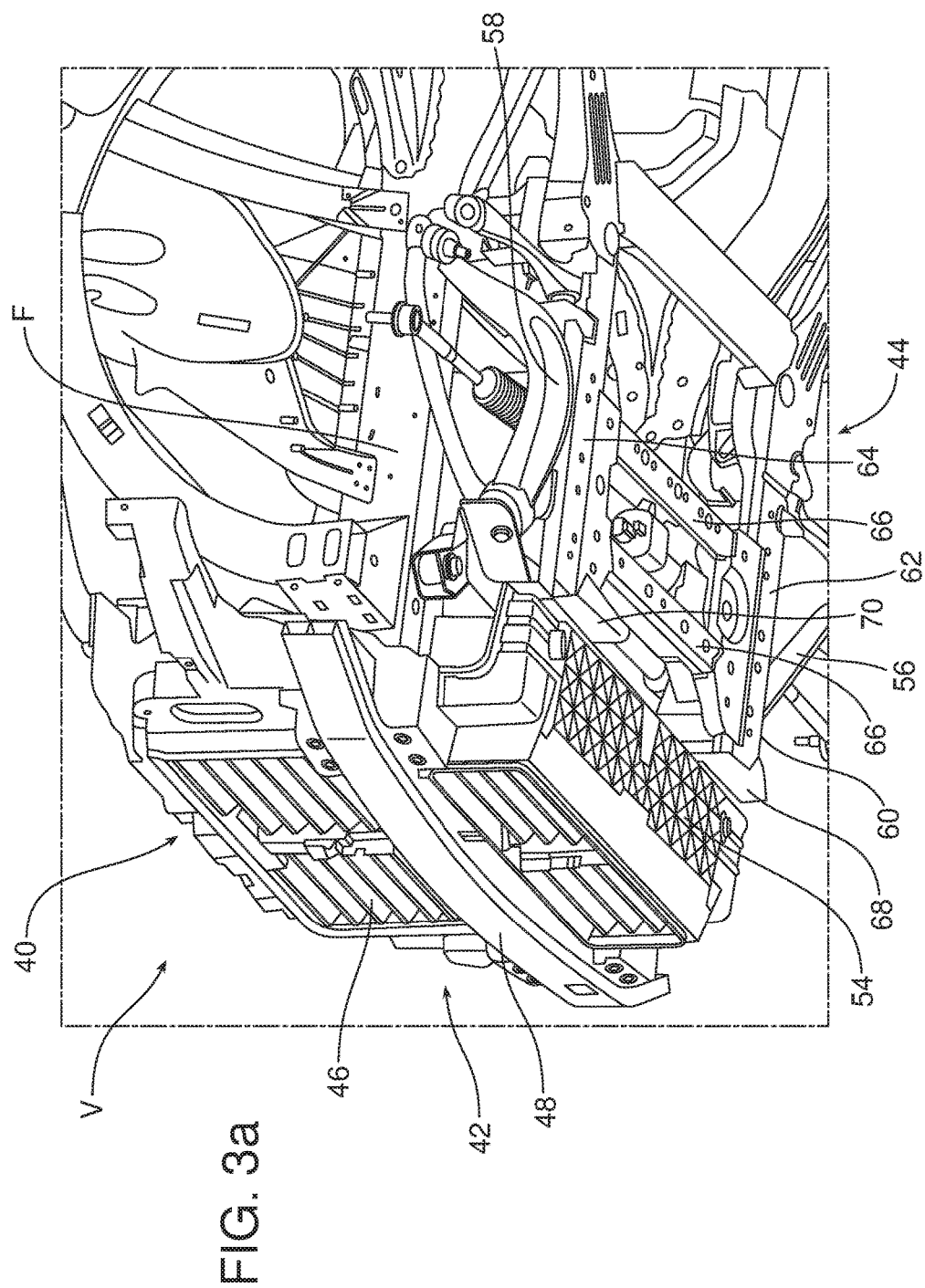
FIG. 3a is a perspective view illustrating a motor vehicle on an assembly line and more particularly, the front end module sans the front end module bolster and the front suspension including the front suspension sub-frame and the first and second tension links connected to that sub-frame.

Reference will now be made in detail to the present preferred embodiments of the motor vehicle assembly, examples of which are illustrated in the accompanying drawing figures.

DETAILED DESCRIPTION

Reference is now made to FIGS. 1 and 2 which illustrate a new and improved SORB structure 10. That SORB structure 10 includes a cross member 12, a first crush horn 14, a second crush horn 16, a first support bracket 18 and a second support bracket 20. The first crush horn 14 and second crush horn 16 are carried on and project forward from the cross member 12. The first support bracket 18 extends between the first crush horn 14 and the cross member 12 outboard of the first crush horn. The second support bracket 20 extends between the second crush horn 16 and the cross member 12 outboard of the second crush horn. FIG. 1 is an exploded view of the SORB structure 10 while FIG. 2 is an assembled view of the SORB structure 10. Crush tubes 22 are received in the apertures 24 of the cross member 12 immediately outboard the two crush horns 14, 16.

The first support bracket 18 includes a receiver 26 for receiving and holding a first bushing or isolator 28. The second support bracket 20 includes a second receiver 30 for receiving and holding a second bushing or isolator 32. The function of the two isolators 28, 32 (best illustrated in FIGS. 4 and 5) will be described in detail below.

Reference is now made to FIGS. 3a-3c, 4, 5, and 6 that illustrate the new and improved motor vehicle assembly 40 which incorporates the SORB structure 10. As illustrated, that motor vehicle assembly 40 includes the front end module (FEM) generally designated by reference numeral 42, a front suspension, generally designated by reference numeral 44 and the SORB structure 10. The front end module 42 includes a grille assembly 46, a bumper beam 48, a radiator 50 and a cooling fan assembly 52 all carried on a cooling module housing 54.

The front suspension 44 includes a first tension link 56 and a second tension 58 carried on a sub-frame 60. The sub-frame 60 includes a first side member 62, having a first longitudinal axis $L_1$ and a second side member 64 having a second longitudinal axis $L_2$. The sub-frame 60 also includes various cross members 66 that connect the first side member 62 and the second side member 64. A first connecting bracket 68 is connected to the forward end of the first cross member 62 and a second connecting bracket 70 is provided at the forward end of the second cross member 64.

Figure 3B:
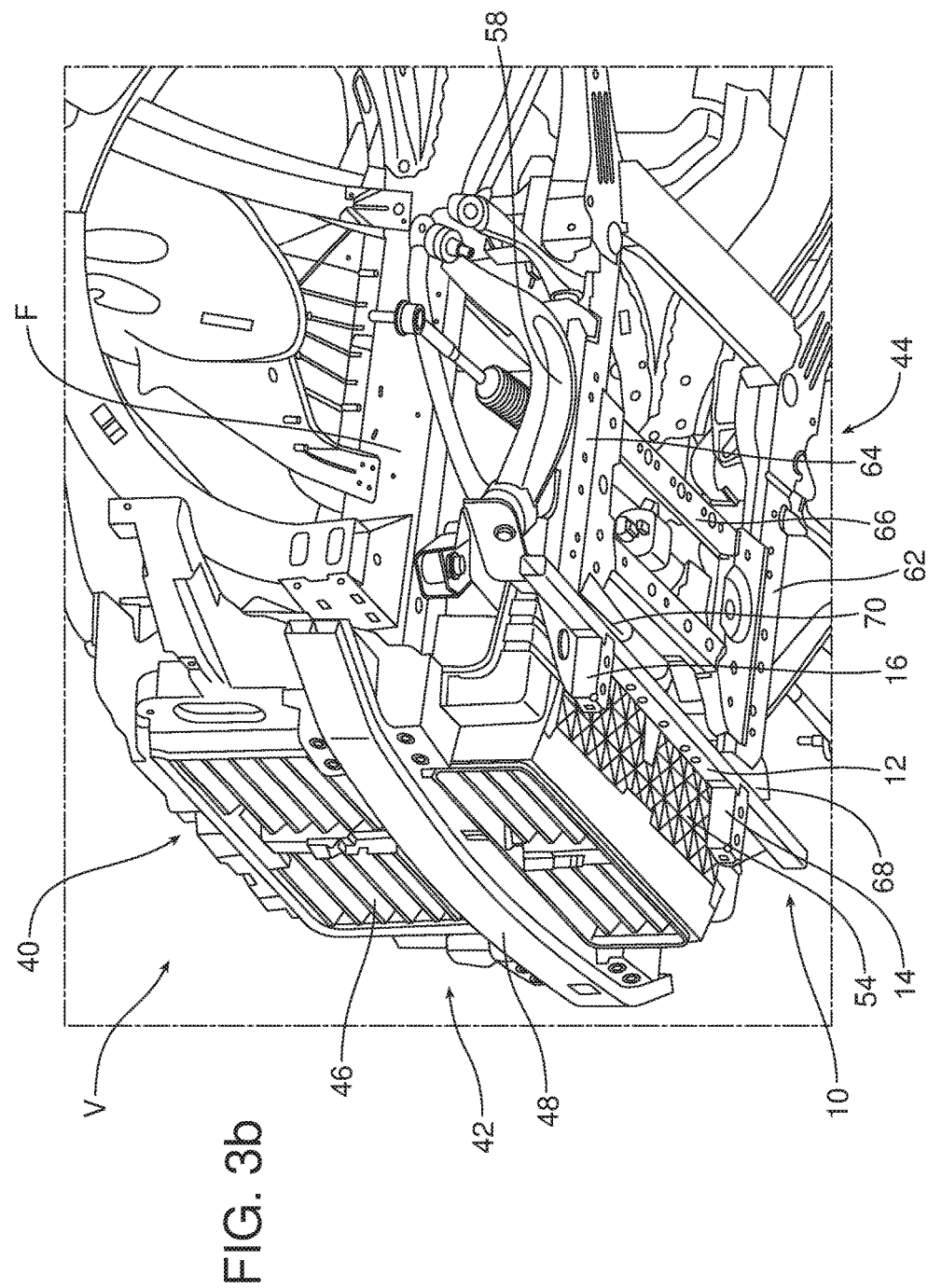
FIG. 3b is a view similar to FIG. 3a illustrating the SORB structure connected to the front end module and the front suspension.

FIG. 3a illustrates a motor vehicle V on the assembly line including the front end module 42 and the front suspension 44 properly positioned and oriented on the main frame F of the motor vehicle. FIG. 3b and FIG. 4 illustrate how the SORB structure 10 is connected to the sub-frame 60 utilizing the first fastener 72 comprising four bolts inserted through the crush tubes 22 in the apertures 24 of the cross member 12 and engaging in cooperating apertures in the first and second connecting brackets 68, 70 at the forward ends of the first side member 62 and second side member 64. Once the SORB structure 10 has been secured in place on the sub-frame 60 with the first fasteners 72, the front end module bolster 74 is secured onto the cooling module housing 54 and connected to the SORB structure by the second fastener 76 or second plurality of bolts. (See FIGS. 3c and 4). When the motor vehicle assembly 40 is properly assembled, the front end module 42 and more particularly, the radiator 50 of the front end module, is supported on the first isolator 28 on the first support bracket 18 and the second isolator 32 on the second support bracket 20 of the SORB structure 10 in order to dampen vibration. See FIGS. 5 and 6.

Figure 3C:
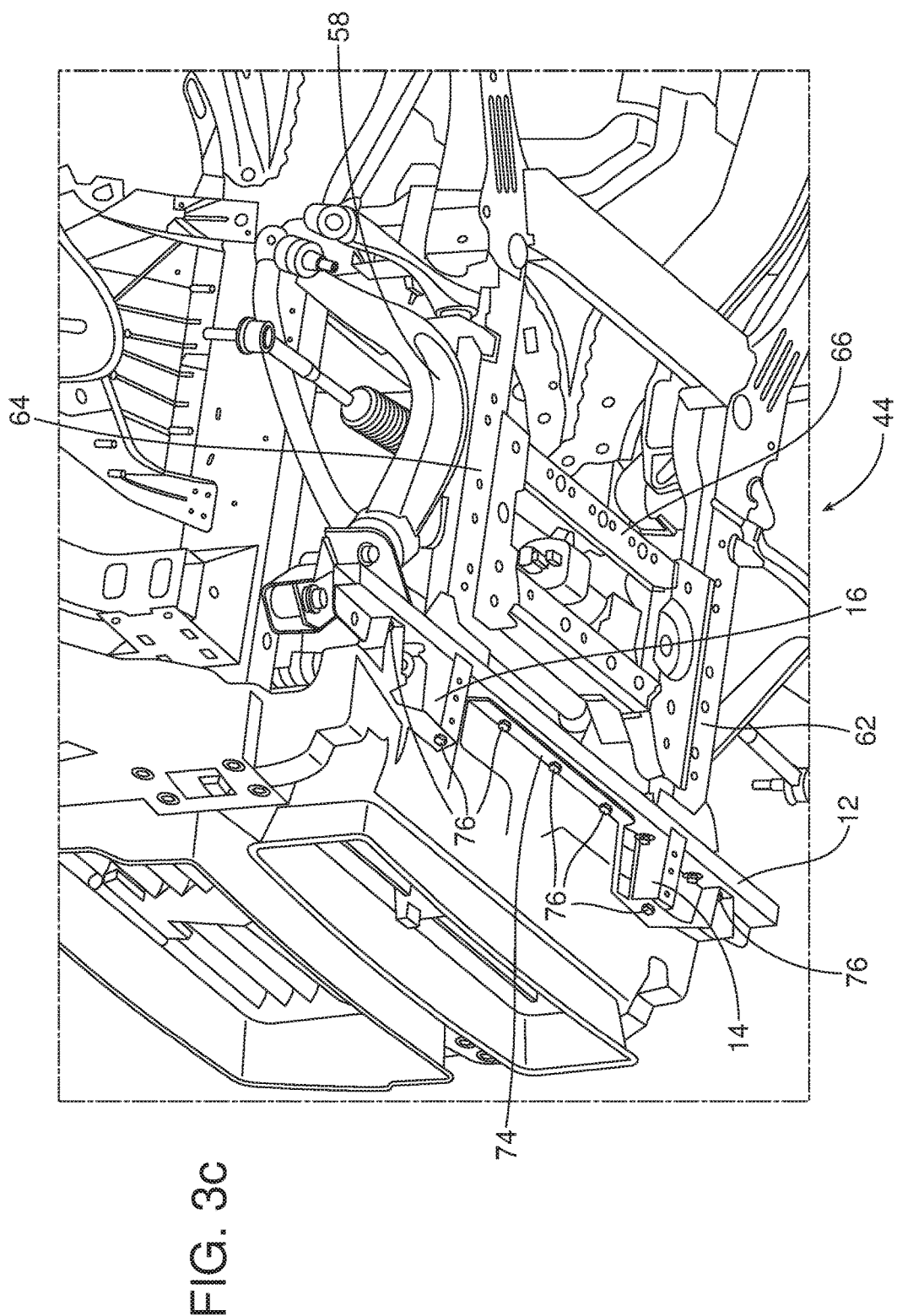
FIG. 3c is yet another perspective view illustrating how the SORB structure is packaged between the front end module bolster and the front ends of the two side members of the front suspension sub-frame.
Figure 4:
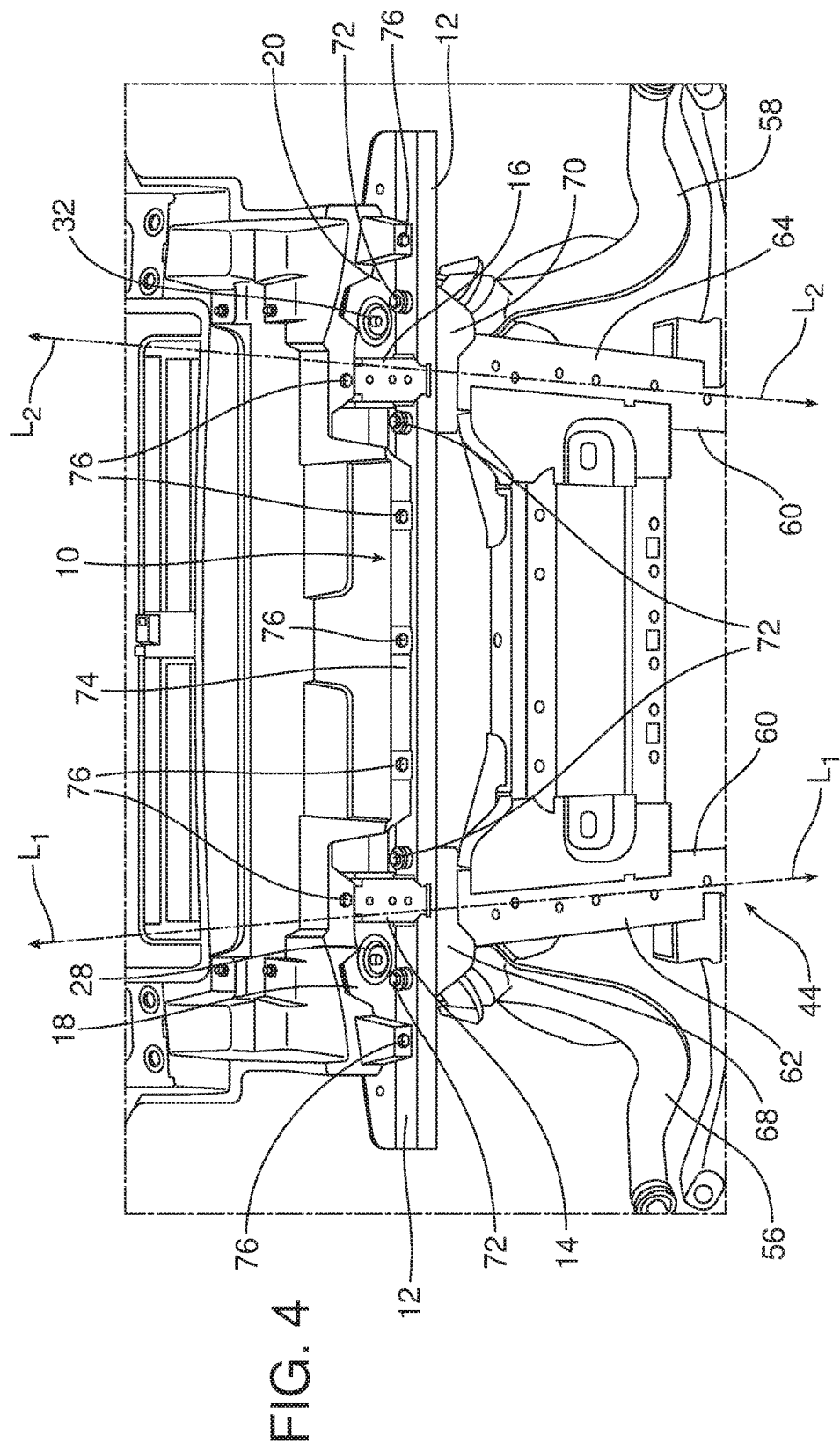
FIG. 4 is a detailed view of the first and second fastener sets utilized to interconnect the front end module, the front suspension and the SORB structure.
Figure 5:
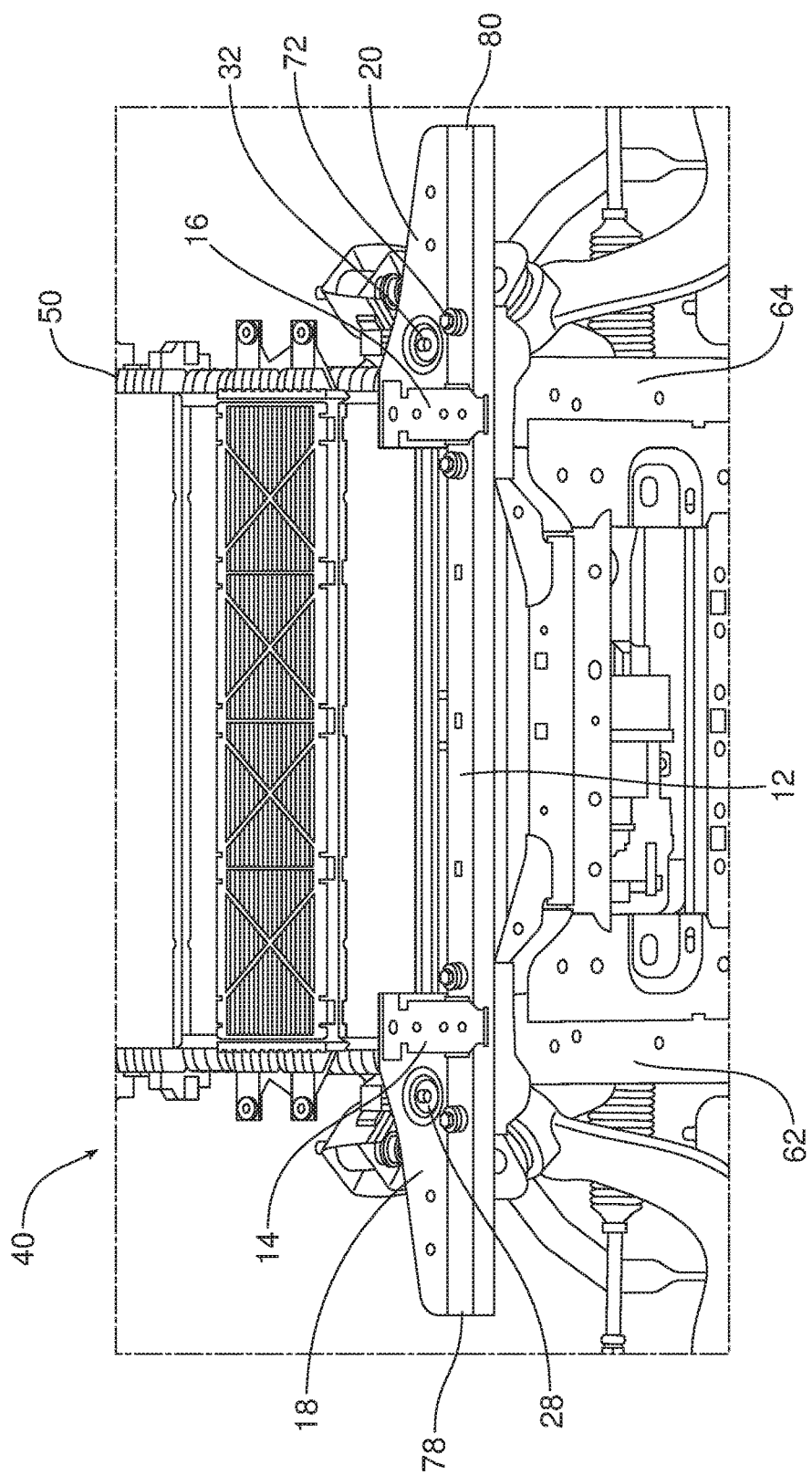
FIGS. 5 and 6 are detailed front perspective and rear perspective views illustrating how the front end module and, more particularly, the radiator of the front end module is positioned overlying the cross member of the SORB structure.
Figure 6:
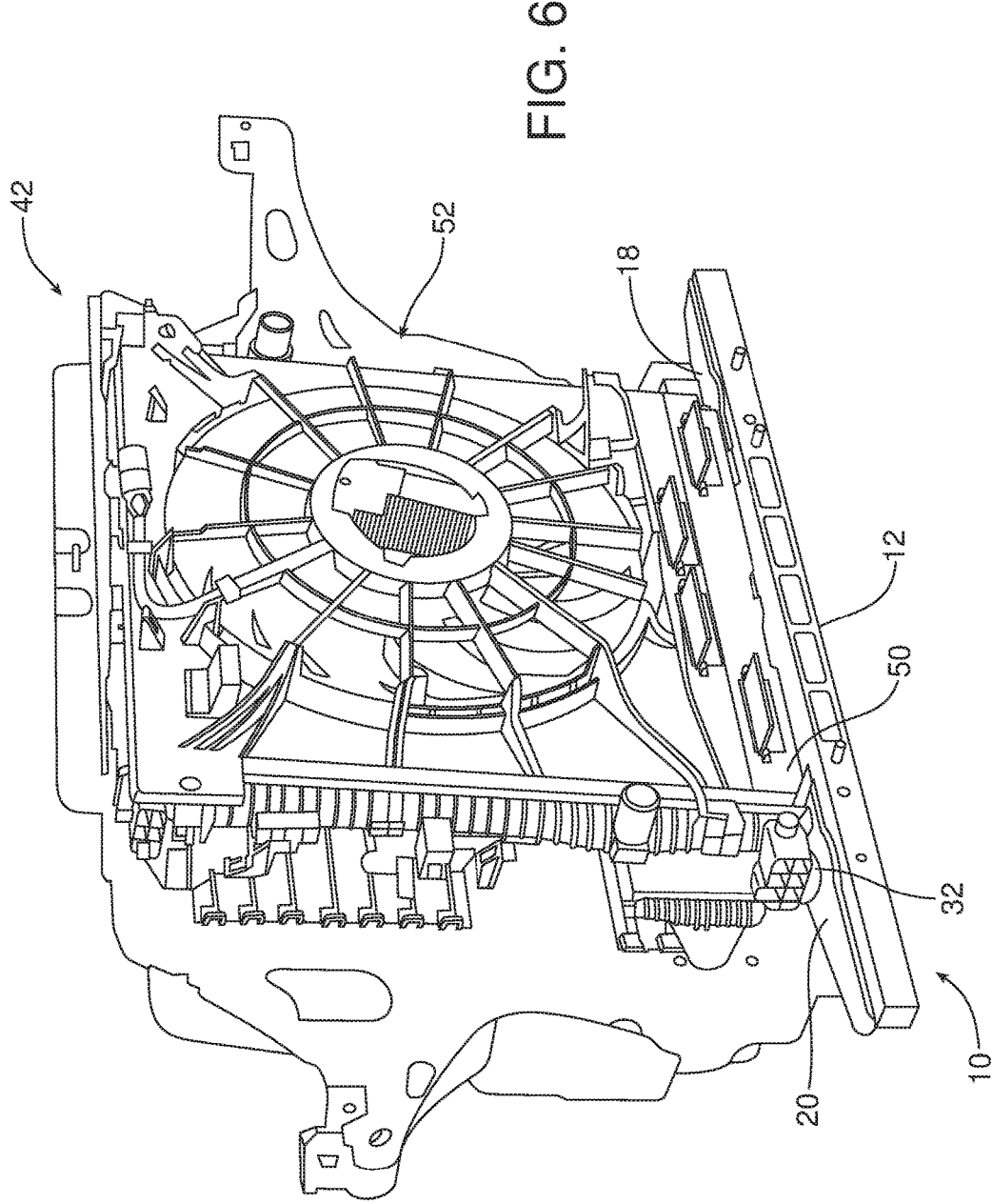

As should also be apparent from reviewing FIGS. 3b, 3c and 4, the first crush horn 14 of the SORB structure 10 is aligned along the first longitudinal axis $L_1$ of the first side member 62 while the second crush horn 16 is aligned along the second longitudinal axis $L_2$ of the second side member 64. As should further be appreciated, the first crush horn 14, the second crush horn 16 and the cross member 12 of the SORB structure 10 as well as the first side member 62 and second side member 64 of the sub-frame 60 of the front suspension 44 are all coplanar. This serves to maximize strength and optimize energy absorption and loading in the event of a crash event.

Significantly, the first support bracket 18 and the first end 78 of the cross member 12 extend outboard the first side member 62 of the front suspension 44. Similarly, the second support bracket 20 and the second end 80 of the cross member 12 extend outboard of the second side member 64 of the front suspension 44. This configuration adds primary structure to the front corners of the motor vehicle and strengthens the front corners of the motor vehicle so as to provide improved energy management in the event of a small offset impact event.

In summary, numerous benefits are provided by the new and improved motor vehicle assembly 40 and the unique SORB structure 10. Safety performance is improved. Transmittal of cooling system resonance (fan) to the body structure is reduced and the connection to the front end module 42 is stiffened. Thus, noise, vibration and harshness (NVH) performance is enhanced. In addition, the SORB structure may reduce the need for added components for off-road and police applications depending upon ground clearance requirements.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A motor vehicle assembly, comprising:
   a front end module;
   a front suspension; and
   a small offset rigid barrier (SORB) structure connecting said front end module and said front suspension, said SORB structure including a cross member, a first crush horn carried on said cross member, a second crush horn carried on said cross member, a first support bracket extending between said first crush horn and said cross member outboard and laterally outside of said first crush horn and a second support bracket extending between said second crush horn and said cross member outboard and laterally outside of said second crush horn.

2. The motor vehicle assembly of claim 1, wherein said front suspension includes a first tension link, a second tension link and a sub-frame.

3. The motor vehicle assembly of claim 2, further including a first receiver in said first support bracket and a second receiver in said second support bracket.

4. The motor vehicle assembly of claim 3, further including a first isolator in said first receiver and a second isolator in said second receiver.

5. The motor vehicle assembly of claim 4, wherein said front end module is supported by said first isolator and said second isolator.

6. The motor vehicle assembly of claim 5, further including a first fastener connecting said cross member to said sub-frame.

7. The motor vehicle assembly of claim 6, wherein said sub-frame includes a first side member having a first longitudinal axis and a second side member having a second longitudinal axis.

8. The motor vehicle assembly of claim 7, wherein said first crush horn is aligned along said first longitudinal axis of said first side member and said second crush horn is aligned along said second longitudinal axis of said second side member.

9. The motor vehicle assembly of claim 8, wherein said first crush horn, said second crush horn, said cross member, said first side member of said sub-frame and said second side member of said sub-frame are coplanar.

10. The motor vehicle assembly of claim 9, wherein said first support bracket and said cross member project outboard said first side member and said second support bracket and said cross member project outboard said second side member.

11. The motor vehicle assembly of claim 10, wherein said front end module includes a radiator overlying said cross member.

12. The motor vehicle assembly of claim 11, wherein said front end module includes a bolster.

13. The motor vehicle assembly of claim 12, further including a second fastener connecting said bolster to said cross member.

14. The motor vehicle assembly of claim 13, wherein said cross member is captured between said bolster and said sub-frame.

15. The motor vehicle assembly of claim 1, wherein said front suspension includes a sub-frame and said SORB structure is coplanar with said sub-frame.

16. The motor vehicle assembly of claim 15, wherein said sub-frame includes a first side member and a second side member and said SORB structure has a first end extending outboard said first side member and a second end extending outboard said second side member.

17. A motor vehicle assembly, comprising:
a front end module including a bolster;
a front suspension including a sub-frame having a first side member and a second side member; and
a small offset rigid barrier (SORB) structure connecting said front end module and said front suspension wherein said SORB structure (a) is coplanar with said sub-frame, (b) has a first end extending outboard said first side member and a second end extending outboard said second side member and (c) is captured between said bolster and said sub-frame.

* * * * *